J. J. ESLER,

Assignor, by mesne assignments, to ESLER & ROPIEQUET MANUFACTURING CO., WAYNE AGRICULTURAL CO., & J. P. FULGHAM.

Seeding Machine.

No. 9,661. Reissued April 12, 1881.

*Attest,*
W. N. Knight
F. H. Knight

*Inventor,*
Jacob J. Esler
By C. H. Ellsworth
His Attorney.

N. PETERS, PHOTO-LITHOGRAPHER, WASHINGTON, D. C.

UNITED STATES PATENT OFFICE.

JACOB J. ESLER, OF BELLEVILLE, ILL., ASSIGNOR, BY MESNE ASSIGNMENTS, TO ESLER & ROPIEQUET MANUFACTURING COMPANY, OF SAME PLACE, AND WAYNE AGRICULTURAL COMPANY AND JESSE P. FULGHAM, BOTH OF RICHMOND, IND.

SEEDING-MACHINE.

SPECIFICATION forming part of Reissued Letters Patent No. 9,661, dated April 12, 1881.

Original No. 88,465, dated March 30, 1869. Application for reissue filed March 16, 1881.

*To all whom it may concern:*

Be it known that I, JACOB J. ESLER, of Belleville, in the county of St. Clair and State of Illinois, have invented certain new and useful Improvements in Seeding Devices for Grain-Drills; and I do hereby declare the following to be a full, clear, and exact description of the same, which will enable others to make and use it, reference being had to the accompanying drawings, forming part of this specification, wherein—

Figure 1:
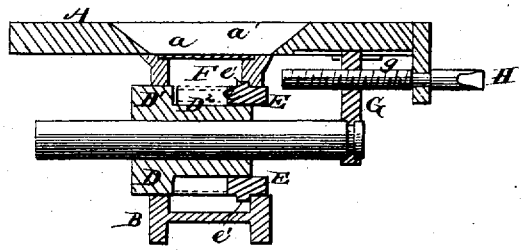
Figure 2:
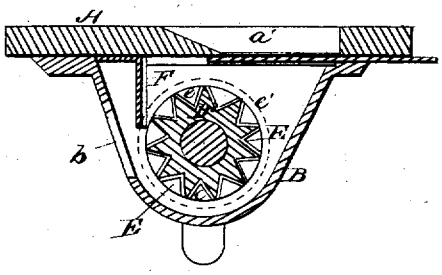
Figure 3:
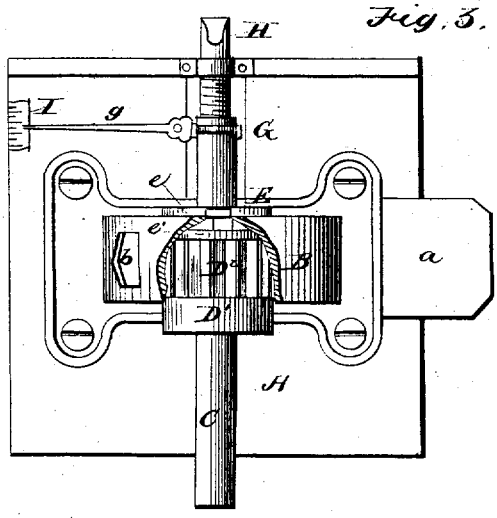

Figure 1 is a transverse vertical section of the seeding mechanism attached to the bottom of the grain-hopper. Fig. 2 is a longitudinal vertical section of the same. Fig. 3 is an inverted plan view.

Similar letters of reference denote the same parts in the several figures of the drawings.

In the present state of the art appertaining to the manufacture and use of seeding-machines the feed mechanism of such machines is divided into two general classes—to wit, gravitating feed and force-feed. In the first class the seed from the hopper of the machine is allowed to drop by the simple force of gravitation through a level or non-elevated discharge-orifice in a seed-cup placed beneath the hopper and containing some kind of an agitator or feeding-wheel; but in going over uneven ground the grain is easily thrown out in too large quantities, and, instead of being uniformly expelled, is discharged in bunches. Nor is the discharge the same under the variations in the quantity of grain in the hopper, for when the hopper is full the discharge is the greatest and most rapid, decreasing in force and speed as the hopper is emptied. Therefore the gravity-feed is not only irregular as to the quantity of grain discharged upon level and uneven ground, but it is also variable, according to the amount of grain in the hopper, and for these reasons is so defective that it has generally gone out of use. In the second class, however, known as the "forced feed," the feeding-wheel lifts the grain up to an elevated discharge-orifice in a uniform continuous stream, and therefore overcomes the defects of the gravitation-feed, which it has generally superseded.

It is essential that machines of both classes shall, in some way, be adapted for sowing a greater or less quantity of grain per acre, according to the requirements of the farmer as to the kind and quality of the grain and of the land which is to receive it. The means resorted to for this purpose are also divided into two classes, to wit: first, that in which the speed of the feed-wheels is increased or decreased by changing the size of the gearing employed to drive the feed-shaft; second, that in which the feed-wheels are adjusted longitudinally through the seed-cups to increase or decrease the grain-carrying capacity of the wheels without changing their speed. As the first of these adjustments requires that gear-wheels of different sizes shall be provided to accompany each machine, that they must be fitted and removed for each change in the quantity of grain to be sown, and that the machine is inoperative for a considerable time while these changes are being made, it has generally been abandoned and the second method adopted in its place, because it enables the feed-wheels to be readily moved without removing or applying any part of the machine, and because its capacity for adjustment is much greater than can be compassed by any system of changing gear-wheels.

For the purpose of explaining the principle of my invention and the best mode in which I have contemplated applying it, so as to distinguish it from other inventions, I propose to recognize herein the state of the art as exemplified by existing patents of the United States.

Prior to the year 1860 seed-cups secured to the bottom of the hopper to receive and support the feed-wheels and direct the discharge of the grain were not known, and the first example of them is shown in the patent of Hiram Moore, No. 30,685, dated November 20, 1860. This is a gravitation-feed, and the quantity of grain discharged is regulated by employing supplemental gearing to change the speed of the feed-wheels. The feed-wheels shown in this Moore patent are in the form of fluted or ribbed cylinders fastened to a driving-shaft, with both ends of each cylinder rotating in and supported by the walls of the seed-cup; and it was supposed that the addition of seed-cups would overcome the defects in the crude form of gravity-feeds then in use, because it not only supported the feed-wheels, but guided the falling seed into the drill-tubes in a more complete and practical manner. Up to this date no attempt had been made by any device attached to the hopper of the machine to support the feed-wheels and direct the course of the grain as it fell out of the hopper.

The next important step that was made in the feed mechanism is shown in the patent to William M. Jones and S. E. Tyler, No. 36,159, dated August 12, 1862, and consists in dispensing entirely with the use of supplemental wheels to change the speed of the feed-wheels for regulating the discharge of grain, and adapting the feed-wheels to slide longitudinally through the sides of the seed-cups, and thus increase or decrease the size of the seed-pockets in the ribbed cylinders which constitute the feed-wheels. This was accomplished by arranging the shaft to move endwise and slide all the feed-wheels simultaneously through their seed-cups. But it was necessary, in order to produce this result, that the feed-wheels should not only move through the sides of the cups and rotate therein, but that one side of each cup should form a cut-off to expose a greater or less length of the pockets in the wheel to act upon the grain in the cup when the wheels were moved. This is effected by employing a head or rosette, consisting of a circular plate rotating on its own periphery in the side wall of the cup, and having a notched or scalloped central opening, through which the ribs of the cylinder slide with sufficiently close contact to form a cut-off and prevent the seed from escaping. By this means the cylinders are adapted to traverse the rotating head for adjusting the length of the seed-pockets to receive a greater or less quantity of grain, and thus regulate the amount to be sown upon a given area. To close the side of the seed-cup opposite the rosette, one end of the cylinder is left plain for a distance, so as to easily rotate and slide in the side of the cup with close contact.

While Jones and Tyler gained a very important advantage in respect to the means for regulating the feed, they failed to make provision for supporting the feed-wheels vertically within the seed-cups, and to direct the course of the discharged grain, as in the Moore patent, but left off the whole lower part of the seed-cup, thereby making only an open gravity-feed. This omitted portion was subsequently supplied by George Esterly, as shown in his Patent No. 79,332, dated June 30, 1868, who, in effect, did no more than to take the seed-cup of Moore and apply to it the fluted cylinder and rosette of Jones and Tyler; but in doing this he combined the advantages of a support for the feed-wheels and a conduit for the discharging grain, with the advantages resulting from regulating the quantity of grain sown without changing the speed of the feed-wheels. It is, however, still the gravity-feed of Moore, attended by all the imperfections of such a feed, with the added defects of a greater capacity for irregular feeding, and crushing and bruising the grain. In the Moore feed the grain is acted upon only by the flutes or ribs of the feed-cylinder, whereas in the Esterly device, when feeding any quantity less than the maximum, a portion of both the fluted and plain parts of the feed-wheel acts upon the grain, and inasmuch as the Esterly feed is nothing more than the gravity-feed, the plain part tends to force the grain out between it and that part of the seed-cup adjoining the cut-off, and thereby crush and break it. This tendency is very much increased when the hopper contains a large quantity of grain, because the superincumbent weight forces the moving grain on the cylinder into the joint next the cut-off. Thus two forces combine to crowd the grain on the cylinder into the joint, one being the weight above it and the other being the frictional force of the plain cylinder, which, of course, is increased in proportion to such weight. The cut-off is employed to sweep off the pockets and hold back the grain in the seed-cup when the feed-wheel revolves, and is made of india-rubber, so as to yield somewhat when the grain in the pockets passes under it, and thereby prevent the crushing action; but the india-rubber is soon cut out by the friction, and its effectiveness destroyed.

The machines thus far described are all gravitation-feeds, because they discharge the pockets of grain successively and permit it to fall by gravity directly through the seed-cups into the drill-spouts or onto the ground. There being necessarily an interval of time between each discharge, and the seed-cups being incapable of retarding the flow of grain through them, the seed is dropped to the ground in bunches, instead of being fed in regular continuous streams of the predetermined quantity per acre. Even this bunching discharge is irregular, because the jarring motion of the machine, in passing over uneven ground, ejects the seed with varying force, and because of the continuously-changing pressure of the seed in the hopper.

For the purpose of overcoming the defects of the gravity-feed, the feeds of the second class, called the "force-feeds," were produced, in which the grain is retained in the seed-cup until forcibly expelled therefrom in continuous regular streams, unaffected by the quantity of grain in the hopper above or the unevenness of the ground over which the machine passes. The first example of this forced or compulsory feed of which I have any knowledge is contained in the patent to Jacob Strayer, No. 32,319, dated May 14, 1861, and consists in a ribbed or toothed feed-wheel rotating within a downwardly-tapering seed-cup, into which the grain flows unimpeded from the hopper, down through the tapering chamber or space behind the wheel, to the bottom of the cup, and from that point is lifted or forced up by the wheel to an elevated discharge-orifice. The wheel does not move in close proximity to the bottom of the cup, as that would crush the grain, and also produce an intermittent and irregular discharge, but it is arranged at such a distance from the bottom that while it prevents the weight of the grain or the jarring of the machine from causing the grain to flow through under the wheel, its teeth or ribs positively carry along the grain that lies between them, and also, by friction or indirect action, move along the layer of grain that lies between their lower edges and the bottom of the cup, and thus, through the combination of these two results, produce an even and regular continuous flow of grain from the elevated discharge-orifice. In the Strayer device the quantity of grain discharged is regulated by changing the speed of the feed-wheels, which, at the date of his invention, was the only method known for accomplishing the purpose. This Strayer patent represents the leading principles in forced-feed seeding-machines existing at the date of my invention, and they are embraced in many different modes of construction by other machines.

It will be observed that one method of regulating the feed above described is by changing the speed of the feed-wheel itself, while the other method does not change the speed of the feed-wheel, but simply varies the feeding surface or capacity of said wheel. These two methods are radically and entirely different from each other, and involve an entirely different mechanical construction, mode of operation, and result.

It will also be observed that the elevated discharge or force feed involves an entirely different construction, mode of operation, and result from those pertaining to the gravity-discharge.

The object of my invention is to combine the uniformly-rotating feed-wheel with the continuously-discharging force-feed mechanism, thus bringing into co-operation in one device the following elements, to wit: first, the feed-wheel revolving at uniform speed; secondly, provision for adjusting the feeding surface and capacity of the wheel without changing its speed; thirdly, the converging space or chamber at the feed side of the wheel to direct the grain into the lower pockets thereof; fourthly, the space under the wheel to prevent crushing the grain and to increase the uniformity of its movement through to the rear side; and, fifthly, the elevated discharge-orifice, to insure a free but continuous and uniform exit to the grain thus fed to it by the variable feed-surface of the rotating wheel operating in connection with the other parts above referred to. To this end it consists, in general terms, in the combination of the seed-cups, the elevated discharge, and the sliding feed cylinders or wheels.

It also consists in the combination, with the seed-cup and its elevated discharge-orifice, of the rotating head or rosette and the feed-wheels adapted to slide through and turn with the head.

It also consists in the combination, with the seed-cup and its elevated discharge-orifice, of the sliding feed wheel or cylinder and a gate or cut-off, to prevent the grain from dropping out of the discharge-orifice over the front of the feed-wheel.

It also consists in the seed-cups, elevated discharge, and sliding feed-cylinders, combined and arranged with a wide tapering or converging space or chamber, through and in which the grain is received from the hopper and directed to the seed-pockets in the wheel at the bottom of the cup, and with a narrow space between the lower edges of the teeth or ribs of the wheel and the bottom of the seed-cup, through which the grain is moved by friction.

It also consists of the devices last above mentioned in combination with the further device of an oblique or inclined feed-edge, over which the grain is delivered from the elevated discharge-orifice.

I construct the grain-drill frame upon wheels, with its flukes, feed-box, and other devices, in the usual manner; and my said invention in no wise relates to a special change in any of said parts.

To the under side of the bottom of the feed-box A, I attach the feed-hopper or seed-cup B. For each fluke there will be a separate hopper or seed-cup, B, and a slide, *a*, will, in the hopper, check or regulate the passage of seed to said hopper. In this wise one or more hoppers being closed—that is, the feed of grain thereto being checked by the slide *a* being closed—the drill may be operated for a part only of its flukes, in accordance with the width of ground to be planted upon.

The said hoppers or seed-cups will be usually cast-iron housings secured by screws or bolts to the bottom A.

Through all the hoppers or seed-cups, of which but one is shown, I pass the shaft C, said shaft lying transversely across the frame of the machine. On said shaft, where it passes through the hopper B, I arrange the feed cylinder or boss D, having the cylindrical part D′ and the fluted part $D^2$. The cylindrical boss D′ will fit the hopper-side, so as to prevent egress of seed.

The said shaft C is revolved by gear-wheels in the usual manner, and the boss D is firmly connected with said shaft, and revolves therewith.

At the end of the fluted part $D^2$, I arrange the rosette E, fitting on its outer circumference into the side of the hopper B, and thus preventing egress of seed, and having lugs or teeth *e* projecting into each channel of the fluted part $D^2$ and fitting therein. Said rosette E has a cylindrical shoulder, *e*′, resting against the inner side of the hopper B, thus preventing lateral motion of said rosette on one side. To prevent lateral play on the other, said shoulder $e'$ will be guided against the seed check-plate F, which is secured to or forms part of the housing B.

It is plain, from the construction of said parts, that as the seed passes from the seed-box through the opening $a'$ it will fall around the feed-cylinder D until it reaches the lowest point of the hopper B, which point is at the lower extremity of the tapering space or chamber B′, whose wall, converging toward the feed-wheel, tends to crowd or press the grain into the pockets of the wheel, and into the narrow space between the wheel and the concave bottom of the cup.

In order that the height of the seed in the seed-box, and its quantity, or any agitation of the seed, shall not influence the regularity of discharge of seed into the tubes of the flukes, I arrange the discharge-opening $b$ at a proper height above the lowest point of the hopper B, and the revolving shaft C will then, by the fluted feed-cylinder $D^2$, carry up the seed from the bottom of the hopper and discharge it in fixed quantities at $b$, as desired; but as it is necessary to increase or lessen the quantity of seed in accordance with the soil, and in accordance with the quality of the seed itself, I arrange the feed-cylinder $D^2$ to deliver a greater or less quantity of seed in the manner following.

It is plain that as the seed drops into each channel or fluting of the cylinder $D^2$ the quantity of seed may be regulated by gaging the size of each channel. I therefore arrange the shaft C and its boss D for longitudinal movement, so as thus to withdraw the feed-cylinder $D^2$ out of the rosette E in accordance with the size of feed-channel required. For this purpose I arrange at the end of said shaft C a gage-block, G, which forks about a groove of the shaft C, and which is moved by the gage-screw H, said screw being secured in the main frame of the drill, and having a square end for application of a crank or wrench to turn the same. Thus by turning said screw H the operator moves the shaft C and each feed-cylinder thereon to decrease or increase the carrying contents of the channels of each feed-cylinder $D^2$; and it is plain that the quantity of seed fed to the flukes may thus be gaged, whether the shaft C continue in rotation or not, and thus the operato rneed in no wise interrupt the operation of the drill to change the feed.

On the gage-block G, I arrange a finger, $g$, which will move laterally with the block, and which indicates on the gage-card I its number of pecks or bushels of grain fed or planted per acre.

The check-plate F, heretofore described, is arranged to stand tangentially over the feed-cylinder $D^2$, in such wise as to check the passage of seed upwardly and beyond the discharge-opening $b$, and to prevent it from falling from the seed-cup over the front of the feed wheel or shaft and out of the discharge-opening $b$.

It will be observed from the above description, and from an examination of the drawings, and of the necessary movements of the grain in a machine constructed as shown and described, that the forced feeding of the grain commences at or near the bottom of the feed-wheel, and not at or near its top, which operation results from the interposition of the enlarged converging or tapering chamber or space through which the grain is fed from the hopper to the bottom pockets. This construction is of great practical importance, as it secures a more regular and certain feed; but as it would be worthless without the elevated discharge-orifice, and the utility of both would be greatly impaired without the space between the lower side of the wheel and the concave bottom of the seed-cup, they are here claimed only in their combination with each other, as hereinafter set forth. If the lower edge of the elevated discharge-orifice were horizontal and straight, the regularity and continuity of the discharge of the grain might occasionally be slightly interfered with, and to prevent any such possibility I make it oblique or V-shaped, as shown in Fig. 3 of the drawings, which perfectly answers the purpose.

Having thus fully described my said invention, what I claim is—

1. In a force-feed seeding-machine, the combination of the seed-cups, the elevated discharge, and sliding feed wheels or cylinders rotating at uniform speed, substantially as described, for the purpose specified.

2. In a force-feed seeding-machine, the combination, with the seed-cup and its elevated discharge, of a rotating-head or rosette at the side of the cup, and a feed wheel or cylinder rotating at uniform speed, and adapted to slide through and turn with the head or rosette, substantially as described, for the purpose specified.

3. In a force-feed seeding-machine, the combination, with the seed-cup and its elevated discharge-orifice, of a sliding feed wheel or cylinder rotating at uniform speed, and a gate or cut-off to prevent the grain in the cup from dropping out of the discharge-orifice over the front of the feed-wheel or its shaft, substantially as described, for the purpose specified.

4. A force-feed grain-drill having in combination a seed-cup, an elevated discharge-orifice, a sliding feed wheel or cylinder rotating at uniform speed, an enlarged tapering or converging space or chamber at the feed side of the wheel to direct the grain into the lower pockets, and a space between the ribs or teeth of the feed-wheel and the concave bottom of the seed-cup, to enable the grain to be fed through under the wheel, both by the direct action of the teeth and by friction or the indirect action of the teeth, substantially as described.

5. A force-feed grain-drill having in combination a seed-cup, an elevated discharge-orifice with oblique or inclined discharging-edge, a sliding feed wheel or cylinder rotating at uniform speed, an enlarged tapering or converging space or chamber at the feed side of the wheel, to direct the grain into the lower pockets, and a space between the ribs or teeth of the feed-wheel and the concave bottom of the seed-cup, to enable the grain to be fed through under the wheel, both by the direct and indirect action of the teeth, substantially as described.

The above specification of my invention signed by me this 12th day of January, A. D. 1881.

JACOB J. ESLER.

Witnesses:

CHARLES W. THOMAS,

E. A. ELLSWORTH.